United States Patent [19]

Kastendieck et al.

[11] Patent Number: 4,698,857
[45] Date of Patent: Oct. 13, 1987

[54] LIGHT SECURE EYECUP FOR USE WITH NIGHT VISION GOGGLES

[75] Inventors: William A. Kastendieck, Wylie; Steve D. Puckett, Garland, both of Tex.

[73] Assignee: Varo, Inc., Garland, Tex.

[21] Appl. No.: 872,132

[22] Filed: Jun. 9, 1986

[51] Int. Cl.⁴ .............................................. A61F 9/02
[52] U.S. Cl. .......................................... 2/426; 2/428; 2/432; 350/145
[58] Field of Search .................. 2/426, 440, 441, 428, 2/429, 430, 454, 6, 432, 436, 437; 350/145, 146, 547, 548, 549, 248; 250/213 VT

[56] References Cited

U.S. PATENT DOCUMENTS

| | | | |
|---|---|---|---|
| 1,389,985 | 9/1921 | Ridgers | 2/454 X |
| 2,848,924 | 8/1958 | Potez | 350/549 |
| 2,881,444 | 4/1959 | Fresh et al. | 2/428 |
| 3,147,489 | 9/1964 | Nelson | 2/441 |
| 3,425,769 | 2/1969 | Stone | 350/548 |
| 3,523,375 | 8/1970 | Frith et al. | 350/145 X |
| 3,535,026 | 10/1970 | Coss | 350/145 X |
| 4,449,787 | 5/1984 | Burbo et al. | 350/145 X |

*Primary Examiner*—Peter Nerbun
*Attorney, Agent, or Firm*—Jerry W. Mills; Roger N. Chauza

[57] ABSTRACT

An eyecup (24) for interfacing a night vision goggle (10) with the eyes of the user (12). A flexible curved eyepiece (28) including a wing (38) provides a tight seal of the periphery of the eyepiece (28) to the occular eye area of the user (12). The seal prevents light (22) emitted from the goggle (10) from escaping out of the confines of the eyecup (24). A fastening sleeve (26) is provided to secure the eyecup (24) about a flange on the goggle (10). An intermediate accordion section (40) allows compression and expansion and maintains the seal between the eyepiece (28) and the ocular eye area. An air vent hole (52) is formed in the accordion section (40) to prevent suction from occurring within the eyecup (24).

16 Claims, 4 Drawing Figures

LIGHT SECURE EYECUP FOR USE WITH NIGHT VISION GOGGLES

TECHNICAL FIELD OF THE INVENTION

The present invention pertains in general to optical equipment, and more particularly to an eyecup for interfacing a user's eyes to night vision goggles.

BACKGROUND OF THE INVENTION

A night vision goggle is a special use device which amplifies very low levels of light to make night viewing possible. A user can thus see and move in extremely low-light situations. Although night vision goggles have a variety of uses, they are particularly important in the field of military night operations. In their most prominent use, night vision goggles allow troops to maneuver in almost complete darkness.

Night vision goggles operate on a principle in which the light reflections of dimly lit objects are amplified many times by an image intensifying tube, and then projected on an integral phosphor-coated display screen. A viewer using such equipment can look through eyepieces and see an amplified representation of an object on the screen.

The use of night vision goggles can, however, create a security problem for the user, because of the green glow of the image emitted from the phosphor-coated screen. Even very small amounts of this glow which might escape around the eyepieces may form a target for unfriendly forces, particularly if they are also equipped with night vision devices.

Previous eyecup designs employ a pair of flexible hollow eyecups, each with a flat end which interfaces the goggle to the user's individual eyes. Since these prior used eyecups do not adequately conform to the contours of the user's facial features, light from the phosphor-coated display screen can escape from around the eyecups and be detected by others.

From the foregoing, it may be seen that a need has arisen for an eyecup which provides an effective ocular seal conforming very closely to the facial features of users in general.

SUMMARY OF THE INVENTION

In accordance with the present invention, an eyecup is provided which substantially eliminates or reduces the problems associated with the prior art devices. In accordance with a principal aspect of the invention, there is provided a flexible eyecup with three sections: a mounting section for mounting the eyecup to night vision goggles, an intermediate flexible accordion section which compensates for slight movement of the night vision goggle relative to the user's eyes, and an eyepiece which is specially curved to provide a sealing fit around the user's eye socket. Importantly, the eyepiece has a side wing section which extends backwardly toward the user's temple in order to conform to the contours of the user's head. The eyecup is constructed of a soft rubber material to provide a comfortable fit to variously dimensioned faces, and to accommodate other military apparatus, such as gas masks.

BRIEF DESCRIPTION OF THE DRAWINGS

Further advantages and features of the present invention will become apparent from the following description thereof, as illustrated in the accompanying drawings in which like reference characters refer to the same parts throughout the different views. Referring to the drawing.

DETAILED DESCRIPTION OF THE INVENTION

Figures 1, 2, 3, 4:
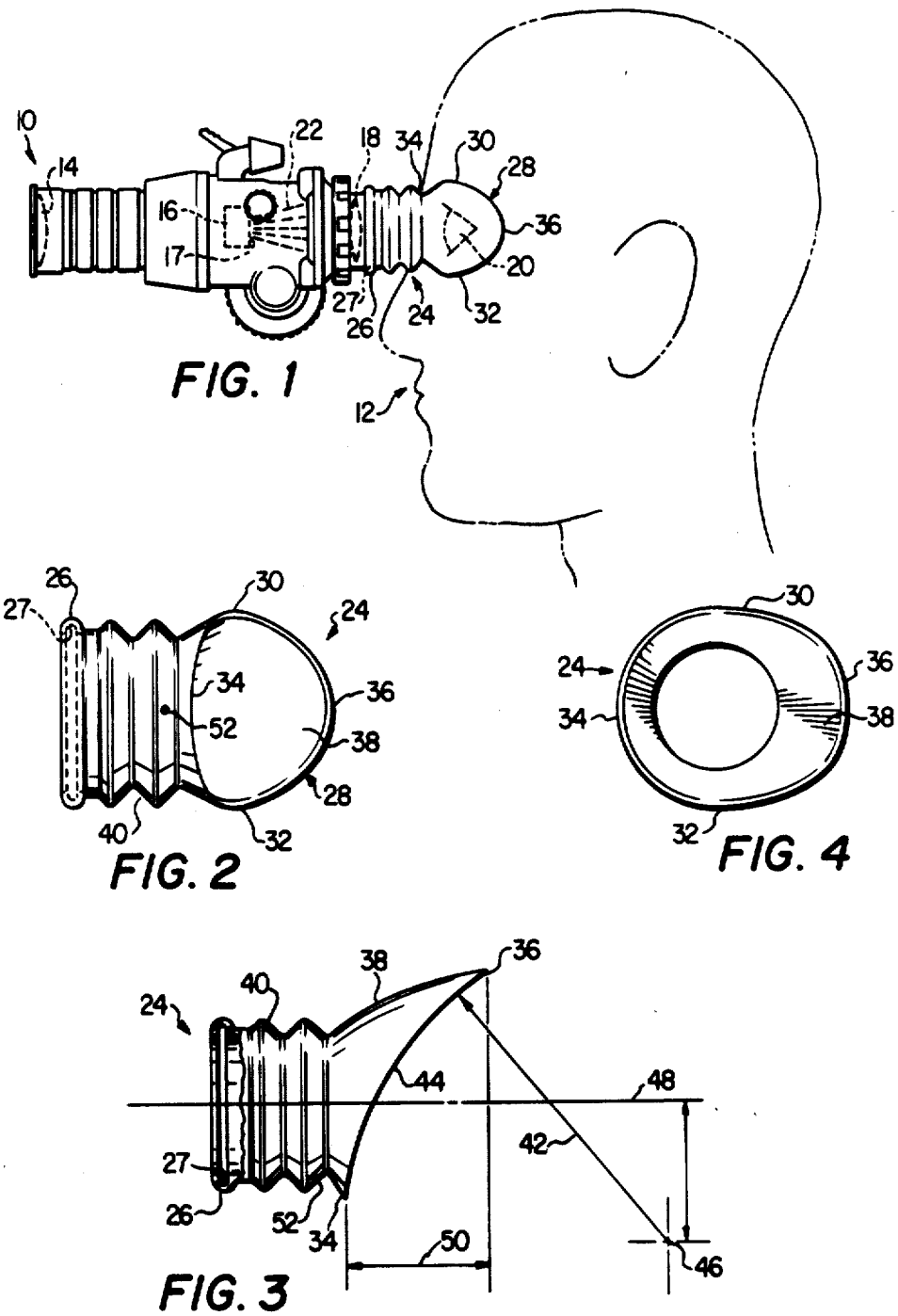
FIG. 1 is a side elevational view of a night vision goggle utilizing the eyecup according to the invention.
FIG. 2 is a side elevational view of the eyecup detached from the night vision goggle.
FIG. 3 is a top elevational view of the eyecup of FIG. 2 showing the radius of curvature of the eyepiece for providing conformance to the facial features of a user.
FIG. 4 is a back view of the eyecup, illustrating the side wing formed outwardly beyond the accordion part of the eyecup.

The application of the present invention is best understood by referring first to FIGS. 1 and 2 of the drawing. The night vision goggle, generally identified by reference character 10, enhances the vision of a user 12 in low-light situations. The night vision goggle 10 receives the image of an object through a front lens 14, and amplifies the image by optical and electronic means, including an image intensifying tube 16, shown in phantom. A representation of the amplified object is displayed on a phosphor-coated screen 17 located on the back of the tube 16. The image from the tube 16 is split by optical means and directed to separate lenses, one of which is shown as 18. The images are then presented to each of the user's eyes, the left eye being shown as 20. The light 22 emanating from the image intensifying tube 16 is many times brighter than the natural ambient light, thus allowing the user 12 to see in low-light situations. Previous eyecup designs allow the light 22 emitted from the image intensifying tube 16 to escape from the confines the eyecup and illuminate the user's face, thereby creating a risk of detection.

The eyecup 24 of the invention is removably fastened to the goggle frame and is disposed between the user's eye 20 and the rear lens 18. To provide a quick attachment or removal of the eyecup 24 to the night vision goggle 10, the eyecup 24 includes a mounting or fastening section comprising a fastening sleeve 26 with an internal annular groove 27 which is engageable with an external flange (not shown) of the goggle 10. The fastening sleeve 26 is constructed such that it cannot easily slip off the flange and become detached from the goggle 10 without a concerted effort by the user 12. The eyecup 24 is constructed of a soft stretchable type of rubber compound to facilitate both the removal and attachment, and the conformance of the eyepiece end to the user's eye. The thickness of the rubber is about 0.03 inch.

According to an important feature of the invention, the eyecup 24 includes an eyepiece 28 shaped to closely conform with the occular area around the eye 20 such that the light 22 emanating from the phosphor-coated screen 17 cannot escape from the eyecup 24 and be detected externally. As defined herein, the eyepiece 28 constitutes that part of the eyecup 24 which makes contact with the user's head in the ocular area encircling the eyes. The various peripheral areas of the eyepiece 28 are identified as an upper 30, lower 32, inner 34 and outer 36 area which correspond respectively to the brow, cheek, nose and temple areas engaged. By curving the eyepiece 28 to follow the contours of the user's head, the eyepiece 28 can maintain full contact about its entire periphery with the user. To that end, the eyepiece 28 has an extended outer side wing 38 which wraps backwardly around the user's eye 20 toward the user's temple. Previous eyecup designs with flat, circular eyepieces do not maintain this type of contact as the human skull curves sharply backwardly at the outermost edge of a person's eye socket. Since even a small leakage of light 22 can alert the enemy to the user's presence, it is important that no light 22 escape from the eyecup 24, particularly at the sides of the user's head where light will not be blocked by the user's nose or the goggle 10 itself.

FIGS. 2-4 show detailed views of the eyecup 24 turned so that it conforms to the user's right eye. Of course, one eyecup style can serve as a goggle interface to either the right or left eye, depending on how the eyecup is turned. FIG. 2 particularly shows the sections of the eyecup 24, including the fastening sleeve 26, the intermediate section comprising the accordion part 40, and the interfacing eyepiece 28.

As noted above, the eyepiece 28 includes an inner area 34 conformable with the facial area between the user's eye and nose. The outer area 36 of the eyepiece 28 extends somewhat outwardly but largely backwardly toward the temple of the user, thus forming the side wing 38. The tip of the wing 38 extends toward the user's temple. As a result, the outer area 36 conforms closely to the side area of the user's eye and shields light emitted by the phosphor-coated screen 17. The upper area 30 and lower area 32 of the eyepiece 28 are similarly shaped, as shown in FIGS. 2 and 3, and include a gradual curve from the inner area 34 to the outer area 36. This curvature facilitates conformance of the eyepiece 28 to the brow and cheek areas of the user's face.

Referring to FIG. 3, the radius of curvature for the eyepiece 28 from the inner area 34 to the outer area 36 is shown by line 42. The noted curvature of the eyepiece 28 forms an arc 44 of radius in the range of about 2.5-3.0 inches, with the center 46 thereof displaced about 1.25 inches from the user's line of sight 48. In the preferred form of the invention, the radius is about 2.83 inches. The axial distance from the outermost point of the outer area 36 to the intermost point of the inner area 34 is about 1.25 inches. This displacement is depicted by line 50. These dimensions have been found to provide an eyepiece 28 which most closely conforms to the general contours of the ocular area of the human head. As previously noted, the flexible material used in the eyecup 24 will additionally allow the eyepiece 28 to further conform to the contours of varying facial features.

The intermediate section comprising the hollow accordion part 40 forms a compressible connection between the eyepiece 28 and the fastening sleeve 26. The accordion part 40 has three purposes. First, it is compressible and thus provides a consistent, even pressure between the eyepiece 28 and the user's face. This decreases the fatigue which may be caused by holding the eyecup 24 too tightly against the user's face. Secondly, once the accordion section 40 is slightly compressed, its tendency to further resist compression will assure that the eyepiece 28 will remain in contact with the user's face, despite slight back and forth movement of the night vision goggle 10. Thirdly, the accordion section 40 allows slight rotation of the user's head with respect to the night vision goggle 10 without the seal being lost between the eyepiece 28 and the occular eye area.

The eyecup 24 of the invention may also be used in conjunction with eye glasses and other military equipment such as gas masks. Because the eyecup 24 is constructed from a flexible material, the side wing 38 can fold or flex outwardly away from the temple so that the eyepiece 28 can make flush contact with the relatively flat surface of glasses or gas masks.

Because the eyepiece 28 creates a tight seal with the user's face, or with the additional equipment such as gas masks or glasses, compression of the accordion section 40 may create a suction within the eyecup 24. This suction would make the use thereof uncomfortable and would also make removal of the night vision goggle 10 difficult. To prevent the occurrence of such a suction, a small air vent hole 52 is provided within the accordion section 40 to allow the inflow of air when the accordion section 40 expands, and to allow the outflow of air when the accordion section 40 is compressed. Because the air vent hole 52 can also allow light to escape, the hole is positioned on the eyecup 24 such that it is directed toward the user's nose where the chance of detection is minimized.

The various embodiments of the invention have been described above in detail with respect to specific structures and dimensions to illustrate the principles and concepts of the invention. Therefore, various modifications, additions, and other applications of the eyecup are possible by those skilled in the art without departing from the spirit and scope of the invention as claimed hereinbelow. For example, the eyecup of the invention may be advantageously used with binoculars, microscopes, periscopes and other viewing equipment. In these applications, the eyecup can prevent ambient light from entering the optical equipment.

What is claimed is:

1. An eyecup adapted for use with a goggle to prevent the leakage of light when the eyecup is pressed against the head of a wearer, comprising:
    an inner eyepiece region for providing a sealing engagement with an area between a user's eye and nose;
    an upper curved eyepiece region providing a sealing engagement with the user's brow;
    a lower curved eyepiece region providing a sealing engagement with the user's cheek;
    an outer eyepiece region extending outwardly toward the user's temple for providing a sealing engagement therewith;
    an interface for connecting said eyecup to the goggle;
    an intermediate section between said eyepiece regions and said interface, and including a compressible accordion section for allowing compression of said intermediate section along an axial axis thereof when pressure is applied to said eyecup without deforming said eyepiece regions, and
    said eyepiece regions and interface and intermediate section are of integral construction of a soft pliable material.

2. The eyecup of claim 1 wherein said eyecup includes a curved edge extending from said inner region to said outer region, said curved edge having an arc of radius of about 2.5-3.0 inches.

3. The eyecup of claim 2 wherein the center of the arc of radius of said curved edge is laterally displaced from the line of sight axis of said eyecup.

4. An eyecup for use with a goggle to interface the goggle to an eye of a user when the eyecup is held in compression against the head of the user, comprising:

a generally flexible rubber body having a central opening, an end for fastening the eyecup to the goggle, and an eyepiece for providing a sealing interface to the ocular area of the use, said eyepiece including an inner region for engaging with that part of the ocular area adjacent the user's nose, an outer region for engaging with that part of the ocular area adjacent the user's temple, and curved upper and lower regions located between said inner and outer regions, the eyepiece thereby having a contoured edge so as to conform to the right eye when oriented in a first orientation, and to conform to the left eye when rotated 180 degrees, and an accordion section formed of a soft pliable rubber and integral with said body, and formed intermediate said end and said eyepiece regions for allowing compression of said eyecup without substantial distortion of said flexible eyepiece regions, said accordion section being formed around an entire circumference thereof.

5. The eyecup of claim 4 wherein said upper and lower regions are curved axially inwardly toward said fastening end, and are curved starting from the inner region to the outer region.

6. The eyecup of claim 4 wherein each curve of the respective upper and lower region has a uniform radius of curvature, the center of which is displaced with respect to an axial axis of the cylindrical central opening.

7. The eyecup of claim 6 wherein the center of said radius is displaced laterally from the axis in the direction of said inner region.

8. The eyecup of claim 4 wherein said compressible intermediate section includes a vent hole to prevent the occurrence of a suction within the eyecup, and the hole is disposed therein so as to direct light emitted therefrom toward the user's nose.

9. The eyecup of claim 4 wherein said eyecup is fabricated with a flexible material such that it can further conform to varied facial dimensions when pressed thereagainst.

10. The eyecup of claim 3 wherein said outer eyepiece region can flex away from the user's head in order to mate with other optical equipment worn by the user.

11. The eyecup of claim 6 wherein the eyecup has a curvature corresponding to an arc of radius of approximately 2.80 inches.

12. The eyecup of claim 1 wherein said intermediate section comprises an accordion structure to allow said compression without substantially distorting the shape of said eyecup.

13. The eyecup of claim 12 wherein said eyecup includes an aperture to allow the passage of air therethrough.

14. The eyecup of claim 1 further including in said interface an internal annular groove for engagement with an external annular flange of the goggle to thereby allow said eyecup to be removably fixed to the goggle.

15. The eyecup of claim 4 wherein said eyecup end is circular in shape and includes an internal annular groove for engagement with an external annular flange of the goggle to thereby allow said eyecup to be removably fixed to the goggle.

16. The eyecup of claim 4 wherein said soft pliable rubber is about 0.03 inch thick.

* * * * *

UNITED STATES PATENT AND TRADEMARK OFFICE
CERTIFICATE OF CORRECTION

PATENT NO. : 4,698,857
DATED : October 13, 1987
INVENTOR(S) : William A. Kastendieck, et al.

It is certified that error appears in the above-identified patent and that said Letters Patent is hereby corrected as shown below:

Col. 6, line 10 (Claim 10, line 1), "claim 3" should be --claim 4--.

Signed and Sealed this

Fourteenth Day of June, 1988

Attest:

DONALD J. QUIGG

*Attesting Officer*  *Commissioner of Patents and Trademarks*